June 2, 1931. B. C. WHITE 1,807,813
ROLL CHANGER
Filed May 6, 1927 7 Sheets-Sheet 2

INVENTOR
Bruce Clark White
BY Marie Louise White, Executrix
ATTORNEY

June 2, 1931. B. C. WHITE 1,807,813
ROLL CHANGER
Filed May 6, 1927 7 Sheets-Sheet 4
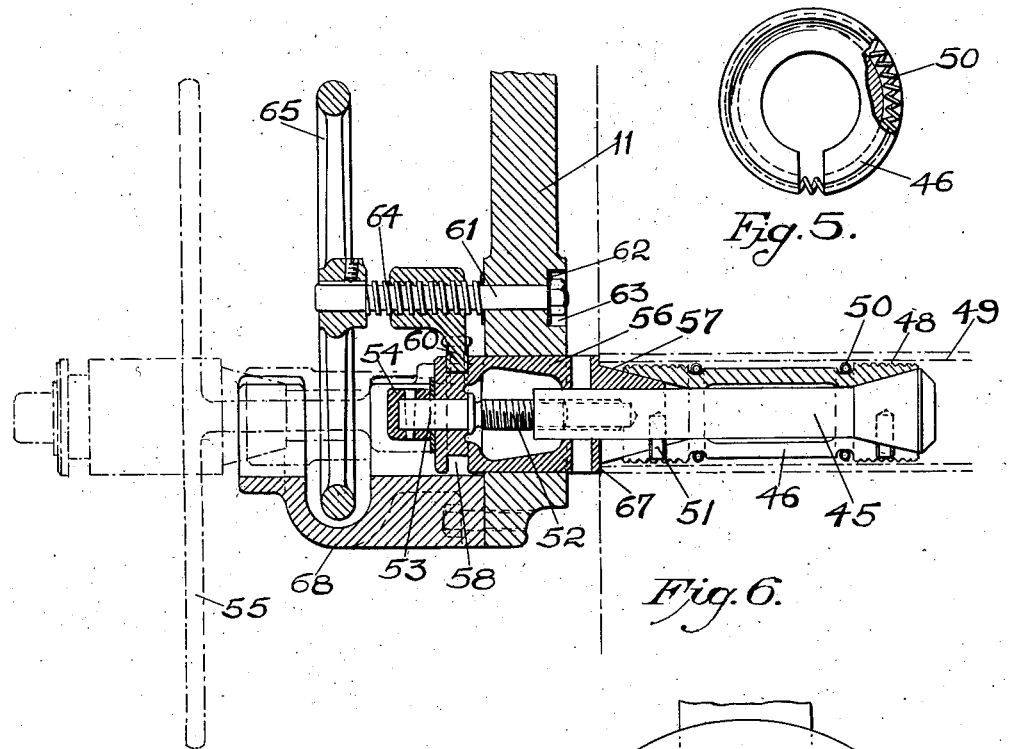
Fig. 5.
Fig. 6.
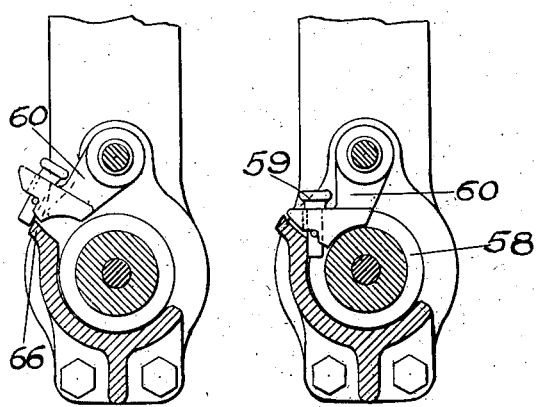
Fig. 7. Fig. 8.
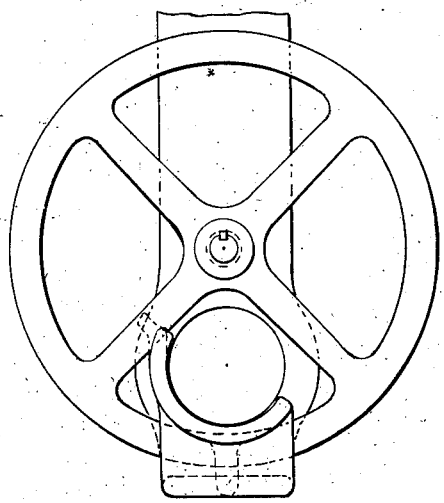
Fig. 9.
INVENTOR
Bruce Clark White
BY
Marie Louise White, Executrix
ATTORNEYS

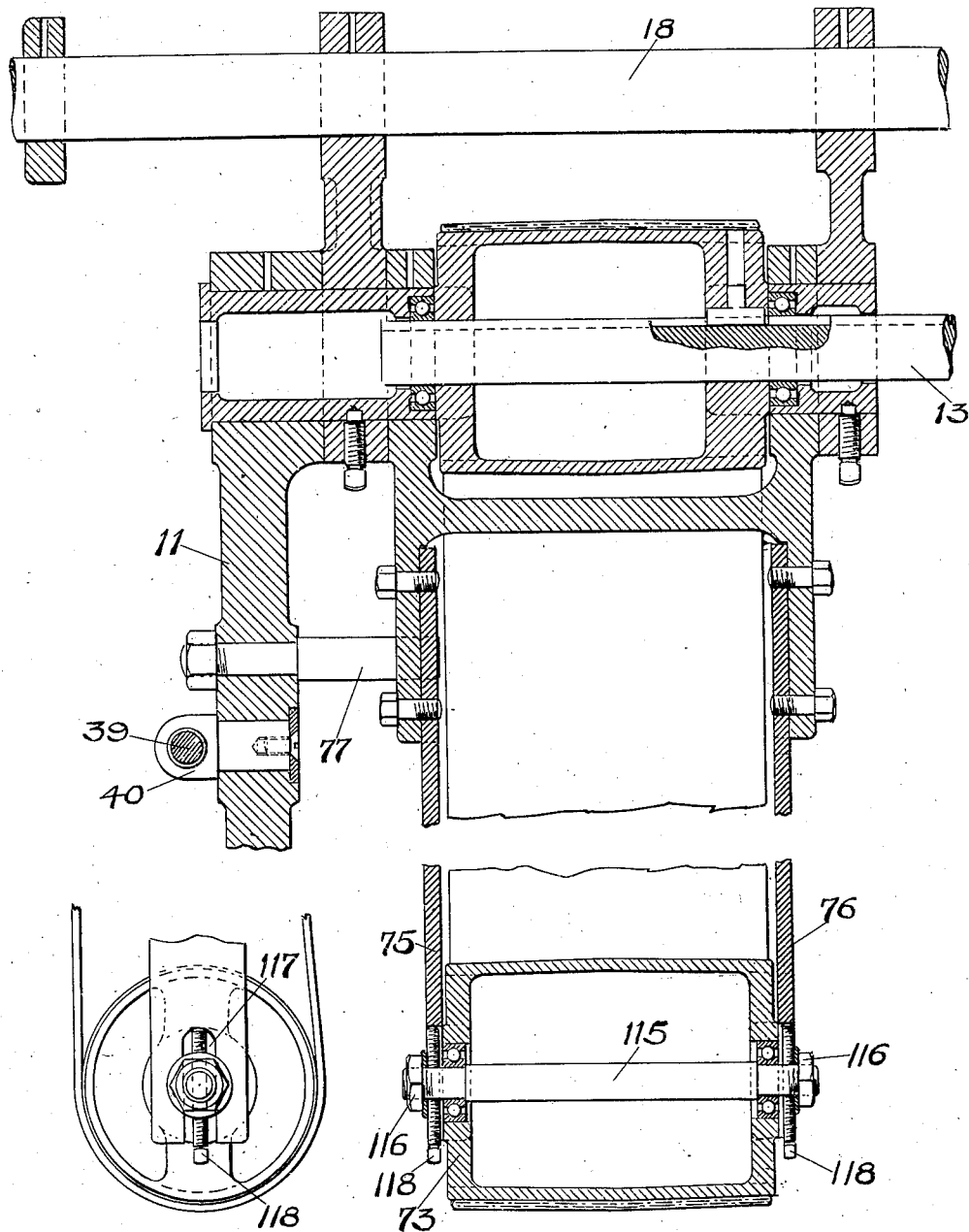

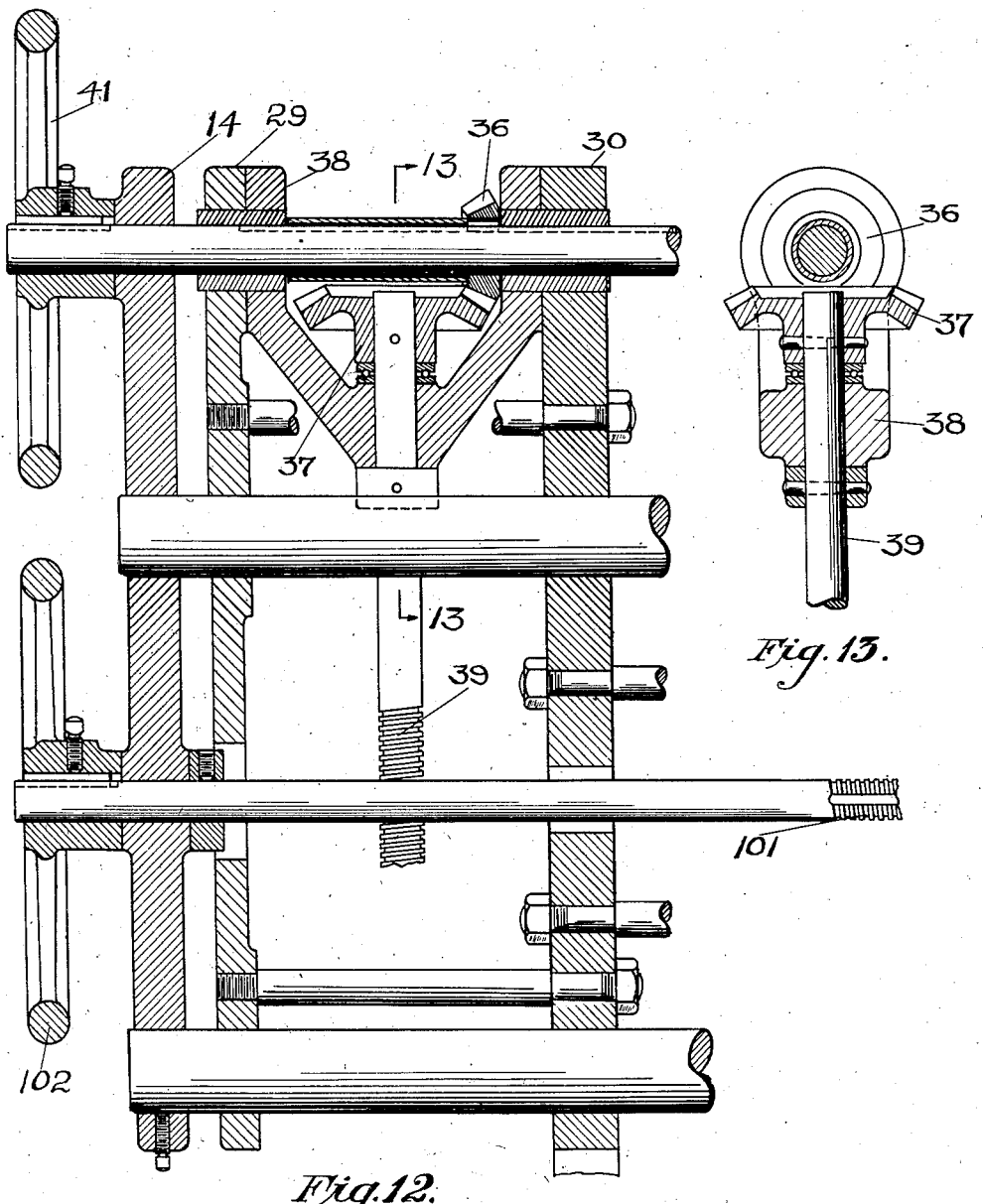

Patented June 2, 1931

1,807,813

UNITED STATES PATENT OFFICE

BRUCE CLARK WHITE, DECEASED, LATE OF NEW YORK, N. Y., BY MARIE LOUISE WHITE, EXECUTRIX, OF NEW YORK, N. Y., ASSIGNOR TO R. HOE & CO., INC., OF NEW YORK, N. Y., A CORPORATION OF NEW YORK

ROLL CHANGER

Application filed May 6, 1927. Serial No. 189,212.

This invention relates to certain improvements in web roll supplying devices for printing presses.

It is the especial object of the present invention to provide a web roll supplying mechanism of simple form in which there is a support for a running roll and a support for a spare roll so arranged that the running web may be easily and quickly attached to the spare roll, and in which the supports are so arranged that a roll can be easily and quickly loaded into either support without interference from the other and from either side of the mechanism.

A further object of the invention is to provide a construction in which the roll supports are hanging supports with means for manipulating them so that they may be swung or moved from running to loading position and held in adjusted position, and to provide certain tension devices, such as belts driven at suitable speed, for controlling the unwinding of the web from the running roll, these tension devices being so mounted that they can be moved out of the way to permit a roll to be loaded into the support.

A further object of the invention is to provide such a web roll supplying mechanism of few parts arranged so as to be accessible to the pressman, and which are easily manipulated and controlled.

With these and other objects not specifically referred to, the invention consists in certain novel parts, arrangements and combinations which will be described in connection with the accompanying drawings and the novel features pointed out in the claims hereunto annexed.

In these drawings,—

Figure 5 is a detail view, partly broken away, of the roll chuck;

Figure 6 is a detail sectional view of one of the bearings for supporting the roll chuck;

Figures 7 and 8 are detail sectional views of Figure 6 showing the means for locking the chuck in position;

Figure 9 is an end view of Figure 6;

Figure 10 is a detail view of one of the belt pulleys;

Figure 11 is a sectional view of the pulleys and one of the belts showing the means for supporting these;

Figure 12 is a sectional plan view of the mechanism for raising the roll supporting arms and for effecting a sidewise adjustment of the arm and belt carrying frame;

Figure 13 is a detail sectional view of the construction shown in Figure 12;

Figure 4:
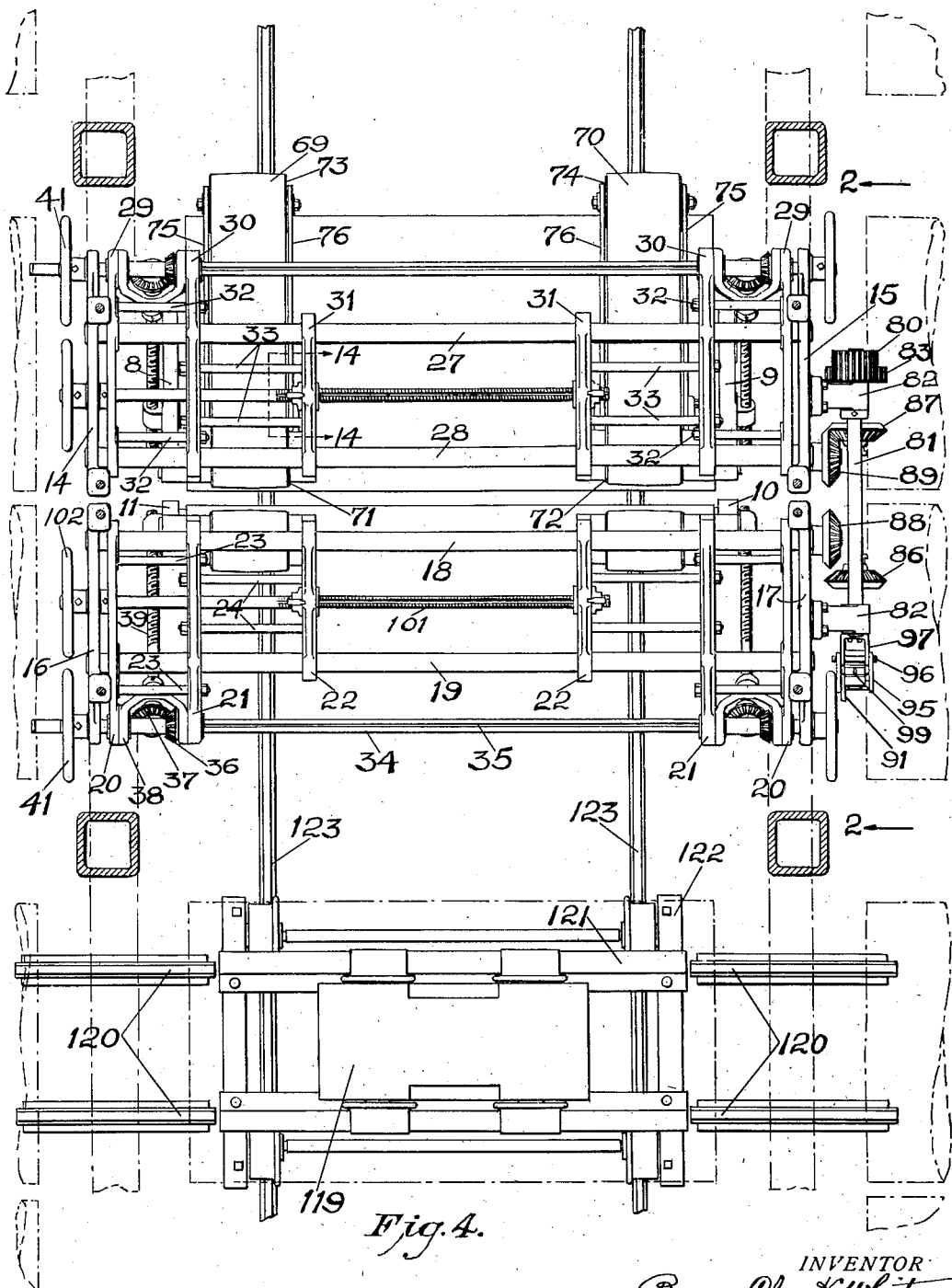
Figure 4 is a plan view taken on the irregular line 4—4 of Figure 3.
Figures 14, 15:
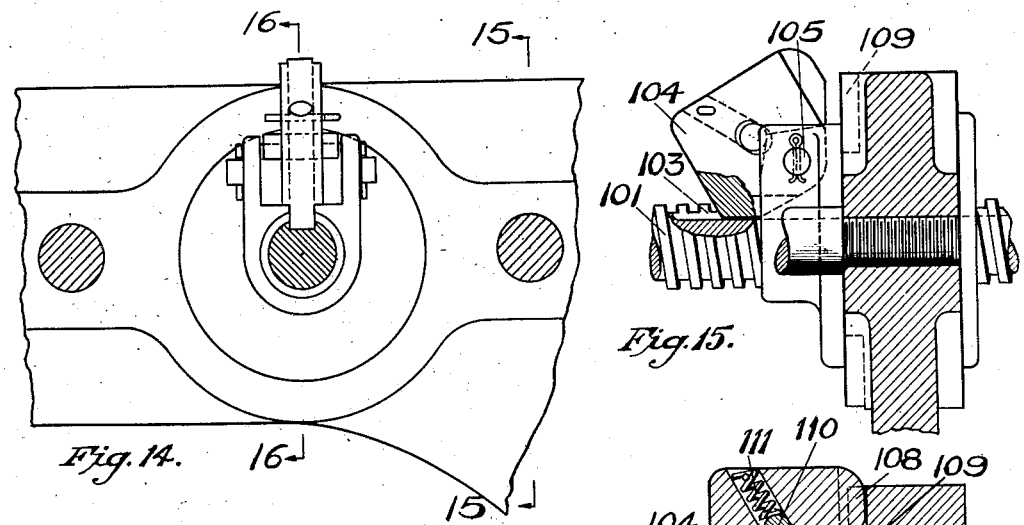
Figure 14 is a detail view, partly in section, taken on line 14—14 of Figure 4 showing the means for locking the frames in adjusted position.
Figure 15 is a detail sectional view taken on line 15—15 of Figure 14.

Referring now to these drawings, the machine selected to illustrate the invention is a rotary web press comprising a plurality of printing units arranged in line and supported on framing 1 carried by posts or standards 2, these standards being arranged, as shown in Figure 4, with a space between them suitable to accommodate the web roll supplying mechanism hereinafter referred to. Two units are shown including form and impression cylinders 3, 4, 5 and 6, with their inking mechanisms, indicated at 7.

Located below the framing 1 and, preferably, directly under the printing units, so as to afford a short web run, is a roll supplying mechanism, this being located in the space between four of the supporting posts 2, before referred to. This mechanism will include a support for a running roll and a support for a spare roll, one of these mechanisms being provided for each printing unit. These supports are independent of each other and each is so constructed that it may be swung up out of the way so that a roll may be loaded into the supports from below and from either side of the mechanism. Furthermore, each of the supports may be adjusted sidewise, for purposes hereinafter referred to, independently of the other. While the specific construction of the supports may be somewhat varied, as shown, they may be pivoted and hung from below the framing 1 which supports the press units. As shown, see particularly Figures 1 and 4, there is a support for a running roll R, which includes a pair of arms 8, 9. There is also provided a second pair of arms 10, 11 for supporting a spare roll S. The arms 8, 9 are pivotally supported on a shaft 12 and the arms 10, 11 are pivotally supported on a shaft 13, so that the arms can freely swing around the shafts.

The arms and certain parts hereinafter referred to are supported so that they can have a sidewise movement in the frame of the machine whereby rolls of different widths may be accommodated. The arms 8, 9 and their associated parts and the arms 10, 11 and their associated parts are mounted so that they can have an independent sidewise adjusting movement. While the constructions for effecting this may be somewhat varied, in the particular construction illustrated there are provided brackets 14, 15 for the mechanism for supporting the running roll R, and brackets 16, 17 for supporting the mechanism for the spare roll S. These brackets depend from and are secured to, by bolts, the under side of the frames 1, before referred to.

The brackets 16, 17 support a pair of rods 18, 19, and slidably supported on these rods are three links 20, 21 and 22, these links being provided on each side of the machine, as shown in Figure 4. The links 20, 21 are tied together by tie-bars 23 and the links 21, 22 are tied together by tie-bars 24, these three links thus making a unitary structure which can be moved sidewise of the machine through connections hereinafter explained. The links are provided with downwardly extending portions 25, 26 (best shown in Figure 3) which support the shaft 13, before referred to, so that the links may have a sliding movement relatively to the shaft. The arms 8, 9 are similarly supported, there being, see Figure 4, a pair of rods 27, 28 supported in the brackets 14, 15, on which are slidingly mounted at each side of the machine links 29, 30 and 31, which are tied together by tie-bars 32, 33. The shaft 12 is supported in these links so as to be freely rotatable therein, and these links have a sliding movement on the rods 27, 28.

The arms 8, 9, 10 and 11 have formed in their lower ends bearings in which the web roll is rotatably supported, and means are provided for swinging the arms to a position where a roll may be readily loaded from a truck into the bearings, or for swinging the arms up out of the way so that a roll may be moved into loading position. While the means for moving the arms may be somewhat varied, in the construction illustrated these means are all the same and a description of one will suffice for all.

Referring to the arms 10, 11, the links 21 support an operating shaft 34, which is provided with a key-way 35. Slidingly mounted on this shaft is a miter gear 36 which meshes with a miter 37 mounted in a yoke 38, the arms of this yoke being supported between the links 20, 21 and slidable with the brackets on the shaft 34, as best shown in Figure 4. This gear 37 is secured to one end of a screw rod 39, Figures 1 and 4, which at its other end is threaded through a block 40 on the arms. The shaft 34 has, outside the fixed bracket 16, a hand-wheel 41 by which the shaft 34 can be rotated, and this construction is, preferably, duplicated on the opposite side of the machine, so that the mechanism may be manipulated from either side. It will be observed that by rotating the hand-wheel 41 the arms 11, 12 will be raised or lowered and may be brought into position to have a roll loaded therein, as shown in the center part of Figure 1, or moved up out of the way, as shown at the left-hand end of Figure 1, to permit a roll to be brought into position beneath them.

It will be understood that the mechanism just described is duplicated with respect to the arms 8, 9 and need not be again described. These arms 8, 9, 10, 11, at their lower ends, provide bearings for the rolls. In the best constructions, the rolls are supported on expanding chucks, these chucks taking bearing in the arms and, furthermore, in the best constructions, these arms will carry means for effecting sidewise adjustment of the roll for adjusting the margin of the running web.

While these chucks may vary widely in construction, in the particular mechanism shown these chucks are expanding chucks having a core 45 tapered outwardly at one end to a diameter greater than the body of the core. Around this core is a split locking member 46, having locking teeth 48 which are expanded against the inside wall 49 of the iron core or pipe on which the web roll is wound, the member 46 being, preferably, expanded against springs 50. The core 45 is held against rotation in the locking member by pins 51 and is threaded into or at one end of an operating screw 52 having an extension 53 provided with a head 54, which can be engaged by a wrench 55, see Figure 6, for effecting a longitudinal movement of the core, by which movement the expansion of member 46 is effected. The chuck also includes a plug 56 having a tapered end 57 which enters the correspondingly tapered recess formed in the locking member 46, this plug having a sliding movement in the lower end of the roll supporting arm, as for instance the arm 11, it being understood that the construction is, preferably, duplicated on each side of the machine.

Means are provided for adjusting these chucks widthwise of the machine to effect a marginal adjustment of the web. While these means may vary, in the particular construction illustrated the plug 56 has a recess 58 in which is arranged to work a spring pressed pin 59, which is connected with an arm 60 on a short shaft 61 secured in the supporting arm, as the arm 11. This shaft, at one end, has a washer 62 which seats in a recess 63 in the arm. Centrally this shaft has a screw thread 64, and the end of the shaft has secured thereto an adjusting wheel 65. By rotating this wheel, the chuck and associated parts are given a sidewise movement for margin adjustment. In loading a roll into the bearings, the roll is brought in on a truck, as hereinafter referred to. The arm 60 is lifted to the position shown at 66 in Figure 7 and the chuck inserted into the core 45 of the roll through the hand-wheel until a projection 67 bears against the end of the core, as shown in Figure 6, whereupon the arm 60 is locked to the plug 56. When the chucks are withdrawn from the rolls, they may rest in brackets 68, as shown in dotted lines in Figure 6, bolted to the lower end of the roll supporting arms and thus be in a convenient position for the operator to insert in the new roll.

Machines embodying the invention will include devices for controlling the unwinding of the running roll and, in the best constructions, these devices will be in the form of belts, two of these belts, marked 69, 70, being provided for each roll position. These belts are preferably arranged so as to lie at each end of the roll, and pass over upper pulleys 71, 72, Figure 4, and lower pulleys 73, 74 mounted to rotate freely in the ends of arms 75, 76, a pair of these arms being provided for each pulley.

Figure 1:
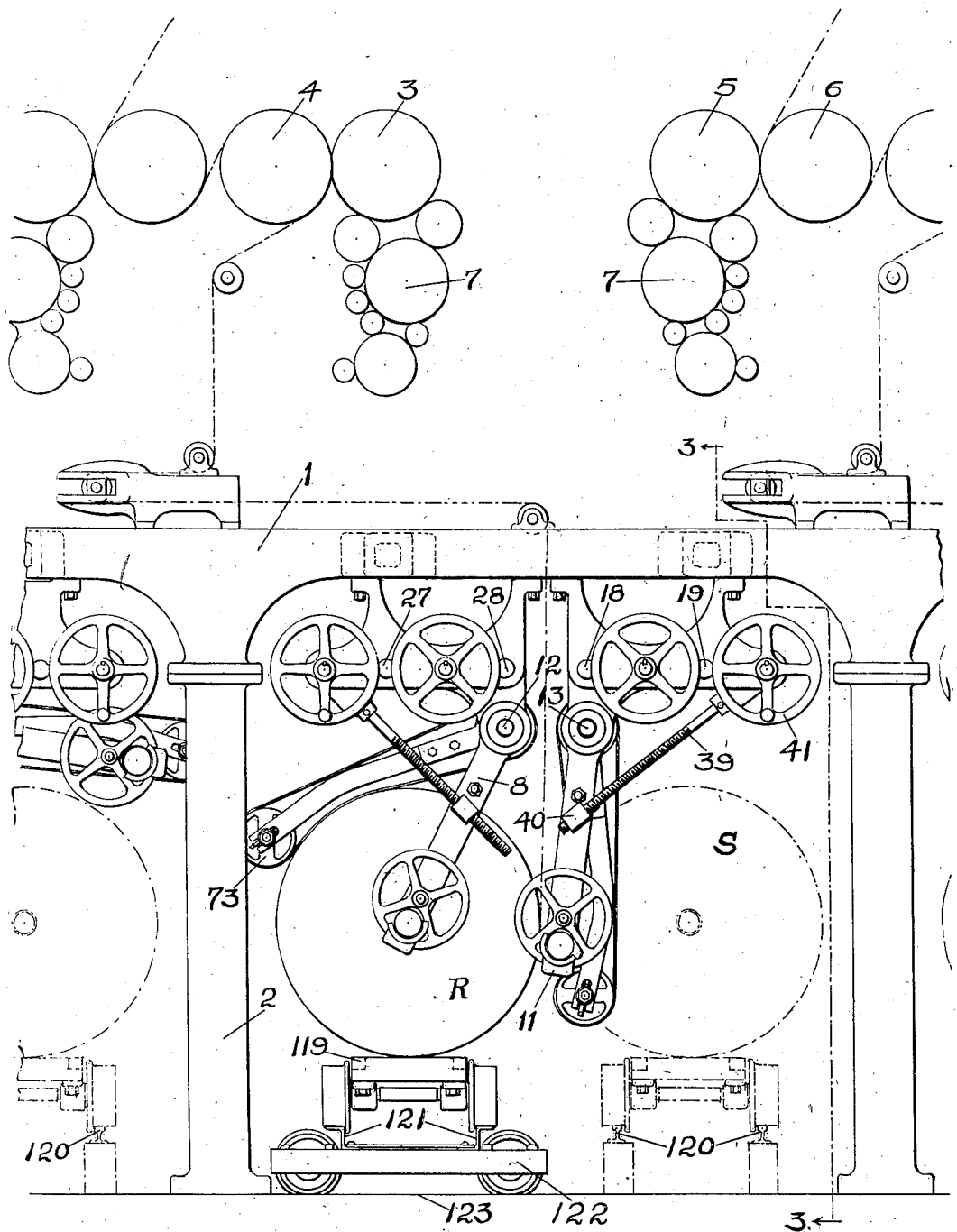
Figure 1 is a side elevation of a printing press showing the improved roll supplying mechanism in relation therewith.
Figure 3:
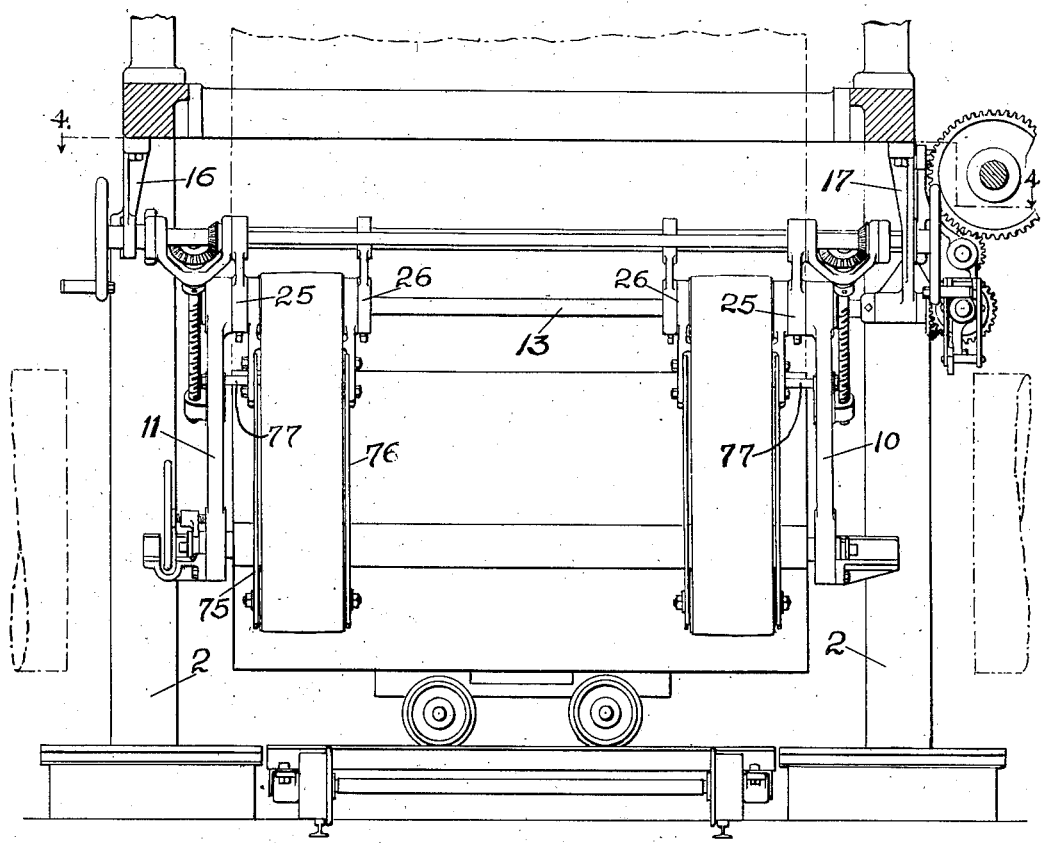
Figure 3 is an end view, partly in section, of part of the construction shown in Figure 1, the view being taken on line 3—3 of that figure.

In the preferred constructions, the shafts 12, 13, on which the roll supporting arms are mounted, are hung from their supporting brackets so as to lie to one side of the vertical axis of a full roll in ordinary running position and, in the preferred constructions, the pulley arms 75, 76 are pivoted on these shafts so that they will be concentric with the point of support of the roll supporting arms, so that, as shown in Figure 1, the belts will extend outward in a horizontal direction to engage the surface of the roll, certain advantages in the control of the web resulting from thus positioning the belts. The upper belt pulleys 71, 72 are, of course, movable on the shafts 12, 13 independently of each other, so that the belts for each roll position may have an independent movement. Connections are provided, in the best constructions, so that when the roll supporting arms are raised by the hand-wheel 41 the pulley arms will be elevated by the lifting movement of the roll supporting arms so that they may be moved to the position shown at the extreme left of Figure 1, but these means will be such that the roll supporting arms may have a downward movement independently of the belts. While this construction may be varied, in the particular mechanism shown the roll supporting arms, as the arms 10, 11, see Figure 3, are provided with a projecting lifter in the form of a pin 77, each of the roll supporting arms being provided with one of these pins. These pins bear against the under side of the belt arms and lift the arms, but the roll supporting arms may be moved downward by the hand-wheel, leaving the belts on a running roll.

Figure 2:
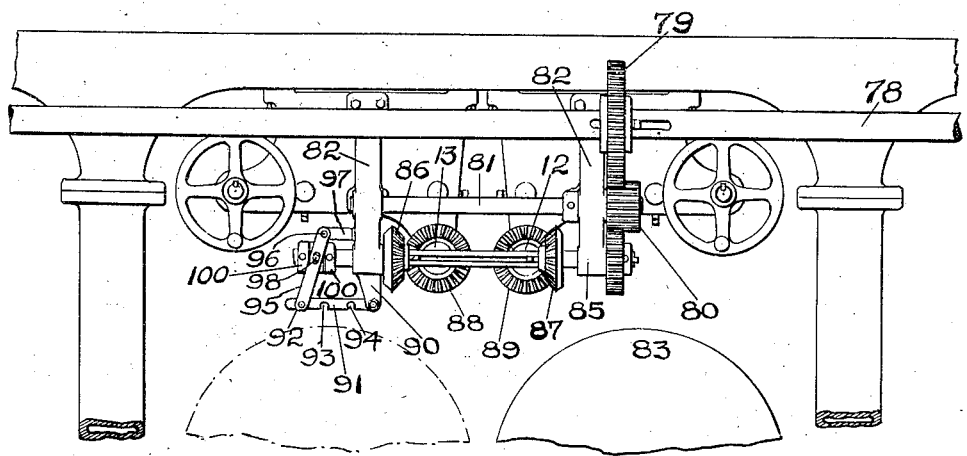
Figure 2 is a detail side view, partly broken away, of a driving mechanism for the tension devices, the view being taken on the opposite side of the machine from that shown in Figure 1 in the direction of the arrow 2 of Figure 4.

The belts are preferably driven at suitable speed, so as to control the feeding of the web into the press at about the speed of the latter, and these means, furthermore, will be such that one of the sets of belts may be disconnected while loading a roll into reserve position. While this may be effected in various ways, a convenient construction is that shown in Figures 2 and 4. As shown in these figures, there is provided at one side of the machine a driving shaft 78, driven from the press, which has keyed thereon a gear 79 which is in mesh with a wide intermediate gear 80 on a shaft 81 journalled in brackets 82 suitably supported from the framing 1, before referred to. The gear 80 is in mesh with a gear 83 on a short shaft 84 which has a sliding movement in bearings 85 in the lower end of the brackets 82. This shaft, at each end inside the brackets, is provided with miter gears 86, 87, which may be moved into mesh with miter gears 88, 89 on the ends of the shafts 12, 13, before referred to.

By operating this shaft 84, either one of the shafts 12, 13 will be thrown into driving relation with one of the gears 86, 87, and the pulleys carried by that shaft driven at press speed. The controlling mechanism for effecting the movement of the shaft may be varied within considerable limits, but a simple and convenient mechanism is that shown in Figure 2. One of the brackets, as bracket 82, has secured to an extension 90 thereof a bar 91 having notches 92, 93 and 94. Working in these notches are levers 95 pivoted at 96 to a bracket 97 extending from one of the brackets 82. These levers carry a shoe 98 which engages a groove 99 (see Figure 4) between two collars 100 pinned on the end of the shaft 84. By operating the levers 95 from the notch 92 to the notch 94, the gear 87 will be thrown out of mesh and the gear 86 thrown in and vice versa, or if the levers are stopped at the center notch 93, both the gears 86, 87 will be out of mesh and the parts idle.

Mechanisms embodying the invention will be so constructed that the belts may be adjusted to operate on full width rolls or three-quarter or half width rolls, the mechanisms being arranged so that the belts may be shifted sidewise of the machine to engage with different width rolls. In the particular construction shown, the mechanisms on the left-hand side of the machine, considering Figure 4, are arranged to be shifted sidewise. While this may be effected in various ways, the mechanism will be duplicated for each roll position, and in the particular construction shown, referring to the lower position of Figure 4, it will be remembered that the links 20, 21 and 22, which support the parts of the mechanism, are tied together by the tie bars 23 and 24. Extending through these links and threaded through one of them, as the link 22, is a right and left-hand screw rod 101 which has secured thereto, outside the fixed member 16, a hand-wheel 102, the links at the other side of the machine being connected to the screw. These links have a sliding movement on the rods 18, 19, and, by operating the hand-wheel 102, the links as a unit and the mechanisms carried by them can be shifted sidewise of the machine.

Figure 16:
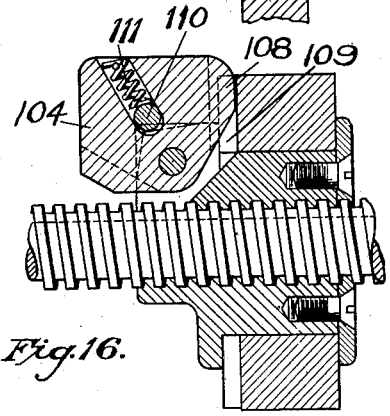
Figure 16 is a similar view showing the parts in a different position on line 16—16 of Figure 14.
Figure 17:
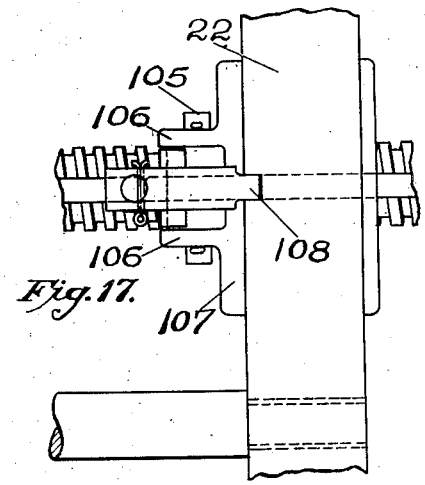
Figure 17 is a detail plan view of the construction shown in Figure 15.

In the best constructions, means are provided for locking these parts in position, and these means are shown in detail in Figures 14 to 17. Referring now to these figures, the screw rod 101, before referred to, is provided with a groove 103 in which is arranged to engage a latch block 104, which is pivoted at 105 between the arms 106 of a bracket 107 secured on the outer side of the link 22, this latch block having a nose 108 which enters a slot 109 in the block. In the position shown in Figure 15, the parts are in locked relation, and in the position shown in Figure 16 are unlocked. To hold the latch block in position, there is provided a pin 110 backed by a spring 111.

In the best constructions, one of the pulleys of each belt is made adjustable for varying the tightness of the belt. In the particular construction illustrated, the lower pulleys are adjustably supported in the belt arms, a detail of such construction being shown in Figures 10 and 11. One of the lower pulleys, as pulley 73, is carried on a spindle 115 which is provided, outside the pulley arms, with lock-nuts 116. The lower ends of the arms are vertically slotted, as indicated at 117, to receive adjusting screws 118 which pass through the ends of the spindls 115. With this construction, the pulleys may be readily and quickly adjusted for varying the tightness of the belts.

The rolls may be run into position by being loaded onto a truck 119 which runs on rails 120, a set of these rails, as shown in Figure 4, being provided for each roll position and extending from either side of the machine. After the roll is loaded onto the truck 119, this truck may be rolled onto rails 121 on a truck 122 running on sunken rails 123 beneath the mechanism. With this construction, a roll can be loaded from either side of the mechanism into either position without interfering with a running roll, and a defective roll may be readily removed, or the spindle of an expiring roll, the whole construction being clear of the framing by which the mechanism is supported.

It will be observed that with the construction shown a spare roll may be hung in position in the roll supporting arms, the arms moved sufficiently to clear it or lift it from the truck, and the belts for this roll placed in contact but not running, and this may be done at any time while the running roll is in use without any interference therewith. When a roll is about to expire, the press is stopped and the expiring roll, by operating the roll supports, may be moved against a previously pasted place on the new roll and the expired web broken off. This may be effected conveniently by operating the hand-wheel to force the expired roll and its web against the pasted place on the fresh roll, and then moving in the reverse direction to clear a space between the rolls for breaking the expiring web, so that a very quick and effective union of the expiring web with a new web may be effected.

It will be observed that with the construction shown the belts follow the roll down as the roll decreases in size. If, however, it is desired to maintain the belts in a somewhat horizontal position, this can be effected by gradually lifting the roll through the roll arm actuating mechanism so that the belts will occupy substantially the same position, this method of operating being of advantage under certain circumstances.

While the invention has been shown and described in its preferred forms, it will be understood that various changes may be made in the construction described without departing from the invention as defined in the appended claims.

What is claimed is:

1. In a printing press, a paper roll, a pair of hanging arms pivoted at their upper ends to a supporting frame, means for transporting said roll into position to be loaded in the arms, means for attaching said roll to said arms while said roll is on said transporting means, and means for moving said arms to lift said roll clear of the transporting means.

2. In a printing press, two pairs of hanging arms pivoted at their upper ends to supporting frames, means for bringing rolls of paper into position beneath said arms, means for swinging said arms upward to permit the introduction of said rolls of paper beneath said arms, means for swinging said arms downward into proper position for mounting said rolls in said arms, and means for raising said roll by its journals.

3. A roll changing device for a printing press supported by an overhead framework, pivoted hanging supports for rolls of paper, feeding devices for said rolls, means for raising said hanging roll supports, and feeding devices clear of said rolls.

4. In a roll changing device for a printing press supported by an overhead framework, two pairs of pivoted hanging roll supporting arms, in combination with independent means for moving either pair of arms whereby one roll may be introduced in the arms and hung while the other roll is operating.

5. In a roll changer for a printing press, a pair of hanging arms pivoted at their upper ends to a supporting frame and having a roll of paper rotatably mounted in their lower ends, in combination with a feed belt hung at its upper end concentrically with the point of support of the hanging arms.

6. In a roll changer for a printing press, a pair of hanging arms pivoted at their upper ends to a supporting frame and having a roll of paper rotatably mounted in their lower ends, in combination with a feed belt hung at its upper end concentrically with the point of support of the hanging arms, means for moving said arms, and means for driving said belt at press speed.

7. In a roll changer for a printing press, a pair of swinging arms pivoted at their upper ends to a supporting frame and having a roll of paper rotatably mounted in their lower ends, in combination with a feed belt hung at its upper end to the said supporting frame and free to swing therefrom except as limited by a stop on said swinging arm.

8. In a roll changer for a printing press, a pair of hanging arms pivoted at their upper ends to a supporting frame and having a roll of paper rotatably mounted in their lower ends, in combination with a belt frame pivotally hung from said supporting frame at a point concentric with the upper pivoted connection of said hanging arms, a pulley at each end of said belt frame and a belt trained about said pulleys and resting upon said roll of paper, and means for changing the position of said roll of paper whereby the angle at which the belt frame hangs will also be altered.

9. In a roll changer for a printing press, two pairs of hanging arms for supporting a running roll of paper and a substitute roll of paper, a separate pivotal support for each pair of arms, and independent means for moving each pair of arms, whereby the webs of the two rolls may be brought into pasting relation at any desired point.

10. In a roll changer for a printing press, a hanging arm for supporting each end of a roll of paper, a hanging belt to engage the periphery of said roll near its end, a sliding frame in which one of said hanging arms and one of said belts is supported, rods for said sliding frames, a screw engaging a nut in each of said sliding frames whereby said frames may be moved simultaneously in either direction, and means for disengaging either of said nuts from the sliding frame and securing either of said nuts to the screw whereby either of said sliding frames may be moved or held stationary by said screw.

11. In a roll changer, the combination of a pair of swinging arms having journals in their lower ends for supporting a roll of paper, frictional devices pivotally supported concentrically with the arms engaging the roll surface, and means for effecting a sidewise movement of the arms and friction devices.

12. In a roll changer, the combination of two pairs of swinging arms having journals for independently supporting a spare roll and a running roll, frictional devices pivotally supported engaging the surfaces of the rolls, and means for effecting an independent sidewise movement of each pair of the arms and its associated friction devices.

13. In a roll changer, the combination of a pair of swinging arms having journals in their lower ends for supporting a roll of paper, frictional feeding devices engaging the surface of the roll associated with the arms, means for effecting a sidewise movement of the arms, and locking means for locking the arms in position.

14. In a roll changer, the combination of two sets of swinging arms having means for independently supporting a spare web roll and a running web roll, and means for swinging one set of arms and the web roll carried thereby towards a web roll in the other set to join a web running from one web roll to the web of the other web roll.

15. In a roll changer, the combination of a frame, two pairs of swinging arms pivotally suspended from the frame and having means for independently supporting a spare roll and a running roll, and means for swinging one set of arms and the expiring web roll carried thereby towards a new web roll in the other set to join an expiring web to the new web roll, said means on a reverse movement separating the rolls to permit the severing of the expiring web.

In witness whereof I have hereunto signed my name.

MARIE LOUISE WHITE,
*Executrix of the Estate of Bruce Clark White, Deceased.*